UNITED STATES PATENT OFFICE.

ARMAND MÜLLER-JACOBS, OF HUNTINGTON, NEW YORK, ASSIGNOR, BY DIRECT AND MESNE ASSIGNMENTS, OF ONE-HALF TO CATHARINA MÜLLER-JACOBS, OF HUNTINGTON, NEW YORK, AND ONE-HALF TO EDWARD WEINGÄRTNER, OF ENGLEWOOD, NEW JERSEY.

PROCESS OF BLEACHING BEESWAX.

No. 883,661.      Specification of Letters Patent.      Patented March 31, 1908.

Application filed January 2, 1906. Serial No. 294,244.

*To all whom it may concern:*

Be it known that I, ARMAND MÜLLER-JACOBS, a citizen of the United States, residing at Huntington, in the county of Suffolk and State of New York, have invented certain new and useful Improvements in Processes of Bleaching Beeswax; and I do hereby declare the following to be a full, clear, and exact description of the invention, such as will enable others skilled in the art to which it appertains to make and use the same.

This invention relates to bleaching of beeswax, and its object is to shorten the time required for the processes now employed and to reduce the resultant expense.

The invention consists in bleaching beeswax by means of fullers' earth, more particularly by heating the wax with the earth at a certain temperature, or between certain temperatures.

Heretofore, beeswax has been bleached by subjecting it to the action of sunlight for a long period of time—from three to four weeks—and chiefly in the summer time. Chemical methods have also been resorted to for de-colorizing the wax, peroxid of hydrogen, dioxid of sulfur, bichromate of potash and permanganate of potash having been used for this purpose; but these chemical processes, as well as the sunlight process, have proved unsatisfactory.

According to my invention, the natural coloring matters in the wax, as well as various impurities, are absorbed, while the wax is in a melted condition, by what is largely a mechanical, though not improbably to some extent, at least, a chemical process. The raw beeswax is heated with admixture of fullers' earth, a hydrated silicate of alumina, and this agent gradually absorbs all the coloring matter and impurities, leaving the wax white, after which the wax is filtered from the residue and the latter treated to recover the wax retained therein.

I am aware that heretofore fullers' earth and Walker's earth have been used for purifying mineral and vegetable oils and fats, but never for the bleaching of wax, or at the temperature employed in the present process.

In carrying out my invention, I proceed as follows: I heat a hundred parts of raw, unbleached beeswax, to about 130° centigrade with constant stirring, and add thereto ten parts, more or less, of fullers' earth, preferably in small quantities to prevent overflow of the liquid. The temperature is then further raised to between 150° and 170°, centigrade, care being observed to avoid higher temperatures. While the heating is continued, the fullers' earth absorbs the matter that discolors the wax, and takes on a dark shade, becoming finally a deep black. The foam of the liquid wax gradually changes in color from yellow to white; and, from time to time, samples are taken from the liquid, filtered, and allowed to cool upon a pane of glass, in order to determine when the bleaching is completed.

When a sample, on cooling, shows a clear white, which usually occurs after the lapse of about thirty minutes, heating is discontinued, and the still hot and liquid wax is freed from the now discolored fullers' earth, by means of filter-presses, by centrifugal action, or by any other desirable method. The residue, comprising the fullers' earth and impurities with about 40 to 50 per cent. of wax is then treated with any suitable solvent, for instance tetrachlorid of carbon, bisulfid of carbon, or the like, to recover the percentage of wax. The liquid thus obtained is distilled to recover both the wax and the solvent.

Experiment has shown that up to about 130° C. fullers' earth has no satisfactory clarifying effect upon the wax. Such change as may occur in the wax below this temperature is of absolutely no practical value and is negligible. The absorption of the impurities by the earth begins slowly at this temperature and continues up to between 155° and 165° C. Experience has demonstrated to me that, if the fullers' earth be added before the temperature of the wax has risen to approximately 130° C., the requisite division of the earth through the liquid is not obtained, and it is very difficult to avoid the formation of lumps, which, when once formed, are exceedingly hard to break up. For this reason, and because no useful result is obtained by adding the earth before the 130° point is reached, I find it advisable not to mix the wax and earth at a lower temperature. In any event, bleaching of the wax cannot be effected at lower temperature than this. On the other hand, it is imperative that the wax, after the addition of the fullers' earth, shall not be allowed to attain a temperature exceeding the approximate limit named, namely between 150° and 170° C. At about 160° C., chemical decomposition and vaporization of the wax sets in, and this action grows more intense as the temperature is still further raised. Therefore, temperatures between 130° C., approximately, and 160° C., approximately, are the only temperatures at which bleaching of wax may be effected by means of fullers' earth. If temperatures below 100° C., for instance are employed, the wax will not become bleached.

What is claimed as new is:

1. The process of bleaching beeswax, which consists in adding fullers' earth to the beeswax and heating the mixture between 130° and 170° C., substantially as described.

2. The process of bleaching beeswax, which consists in heating the beeswax to approximately 130° C., adding fullers' earth, and then still further raising the temperature toward 170° C., substantially as described.

3. The process of bleaching beeswax, which consists in heating the beeswax with fullers' earth considerably above 130°, substantially as described.

In testimony whereof, I affix my signature, in the presence of two subscribing witnesses.

ARMAND MÜLLER-JACOBS

Witnesses:
  EMIL PFLEIDERER,
  GROVER C. TOWNSEND.